United States Patent
Le et al.

(10) Patent No.: US 9,065,924 B2
(45) Date of Patent: Jun. 23, 2015

(54) SYSTEM AND METHOD FOR USING AN EXTERNAL COMPONENT TO CONDUCT WIRELESS COMMUNICATIONS

(75) Inventors: Huy B. Le, Milpitas, CA (US); Hassan Lashkari, Palo Alto, CA (US); John M. Richey, San Francisco (CA); Michael J. Giles, San Jose, CA (US)

(73) Assignee: APPLE INC., Cupertino, CA (US)

( * ) Notice: Subject to any disclaimer, the term of this patent is extended or adjusted under 35 U.S.C. 154(b) by 316 days.

(21) Appl. No.: 13/597,427

(22) Filed: Aug. 29, 2012

(65) Prior Publication Data

US 2014/0065962 A1 Mar. 6, 2014

(51) Int. Cl.
*H04B 7/00* (2006.01)
*H04M 1/725* (2006.01)

(52) U.S. Cl.
CPC ........ *H04M 1/7253* (2013.01); *H04M 2250/02* (2013.01); *H04M 2250/06* (2013.01)

(58) Field of Classification Search
CPC . H04L 67/04; H04L 2209/76; H04L 2209/80; H04L 63/0272; H04L 63/0492; H04L 29/06027; H04L 63/083; H04W 84/18; H04W 4/008; H04W 12/06; H04W 28/18; H04W 48/16; H04W 84/12; H04W 12/08; H04M 1/6066; H04M 1/7253; H04M 1/6058; H04M 2250/02; H04M 2250/06

USPC ........ 370/208, 210, 281, 329, 401, 338, 277, 370/354, 468; 455/127.1, 129, 41.1–41.3, 455/411, 550.1, 77, 552.1

See application file for complete search history.

(56) References Cited

U.S. PATENT DOCUMENTS

| | | | | |
|---|---|---|---|---|
| 8,554,154 | B1* | 10/2013 | Everson et al. | 455/73 |
| 2008/0175379 | A1* | 7/2008 | Hansen et al. | 380/44 |
| 2011/0311052 | A1* | 12/2011 | Myers et al. | 380/270 |

* cited by examiner

*Primary Examiner* — Golam Sorowar
(74) *Attorney, Agent, or Firm* — Park, Vaughan, Fleming & Dowler LLP

(57) ABSTRACT

A system and method for improved wireless communications at a host device (e.g., a portable computing device, a mobile communications device) having multiple wireless communication abilities (e.g., Bluetooth® and Wi-Fi®). When a component (e.g., a monitor, an Ethernet dongle) having Bluetooth capability is coupled to the host device (e.g., wired or wirelessly), the host device copies its Bluetooth link keys to the component, deactivates its own Bluetooth module and activates (or initiates activation of) the component's. The component's Bluetooth module is operated using a software stack executing on the host device. Thereafter, the component handles Bluetooth operations and the host device communicates with Bluetooth devices via the component. Greater radio isolation is thus provided between antennae used by Bluetooth and Wi-Fi.

19 Claims, 3 Drawing Sheets

SYSTEM AND METHOD FOR USING AN EXTERNAL COMPONENT TO CONDUCT WIRELESS COMMUNICATIONS

BACKGROUND

This invention relates to the field of wireless communications. More particularly, a system and methods are provided for improving wireless communications by increasing the isolation of antennae used by different wireless modules.

Multiple wireless technologies, such as Wi-Fi® and Bluetooth® often co-exist in a single host computing or communication device, with separate modules or chipsets, but may use or attempt to use the same frequency band (e.g., the 2.4 GHz band). If one antenna or radio transceiver is shared by the technologies, perhaps on a time basis, they can both be employed, but not at the same time and not to full capability. This may detract from a user's enjoyment of the device, and potentially decreases each module's throughput.

Even if each radio has access to a separate antenna, simultaneous use will often cause one to interfere with the other, especially if their antennae are not sufficiently isolated (i.e., separated). As host devices shrink in size, it becomes less and less feasible to provide adequate antenna isolation, thereby making it even more difficult to use both technologies simultaneously and to their full capabilities.

SUMMARY

In some embodiments of the invention, a system and methods are provided for conducting wireless communications. In these embodiments, increased RF (Radio Frequency) isolation is provided for a host device, between emitters used by different wireless communication technologies (e.g., Bluetooth and Wi-Fi).

In some embodiments, Bluetooth operations of the host device (e.g., a portable computer, a mobile communication device) are offloaded to a physically coupled component (e.g., a monitor, a keyboard) that possesses suitable Bluetooth capability (e.g., chipset and antenna). In these embodiments, Bluetooth link keys used by the host device and one or more wireless devices (e.g., a mouse, a headset) are copied to the component, the host device then deactivates its Bluetooth module and the component's module is activated. The component will then automatically discover and establish connections with the wireless devices.

If multiple components with Bluetooth capability are physically coupled to the host device, it may compare their capabilities (e.g., version, power, separation) to determine which should be activated. If a component to which Bluetooth operations have been offloaded is disconnected or becomes inoperative, the host device may resume Bluetooth operations or transfer them to a different component.

DETAILED DESCRIPTION

Figure 1:
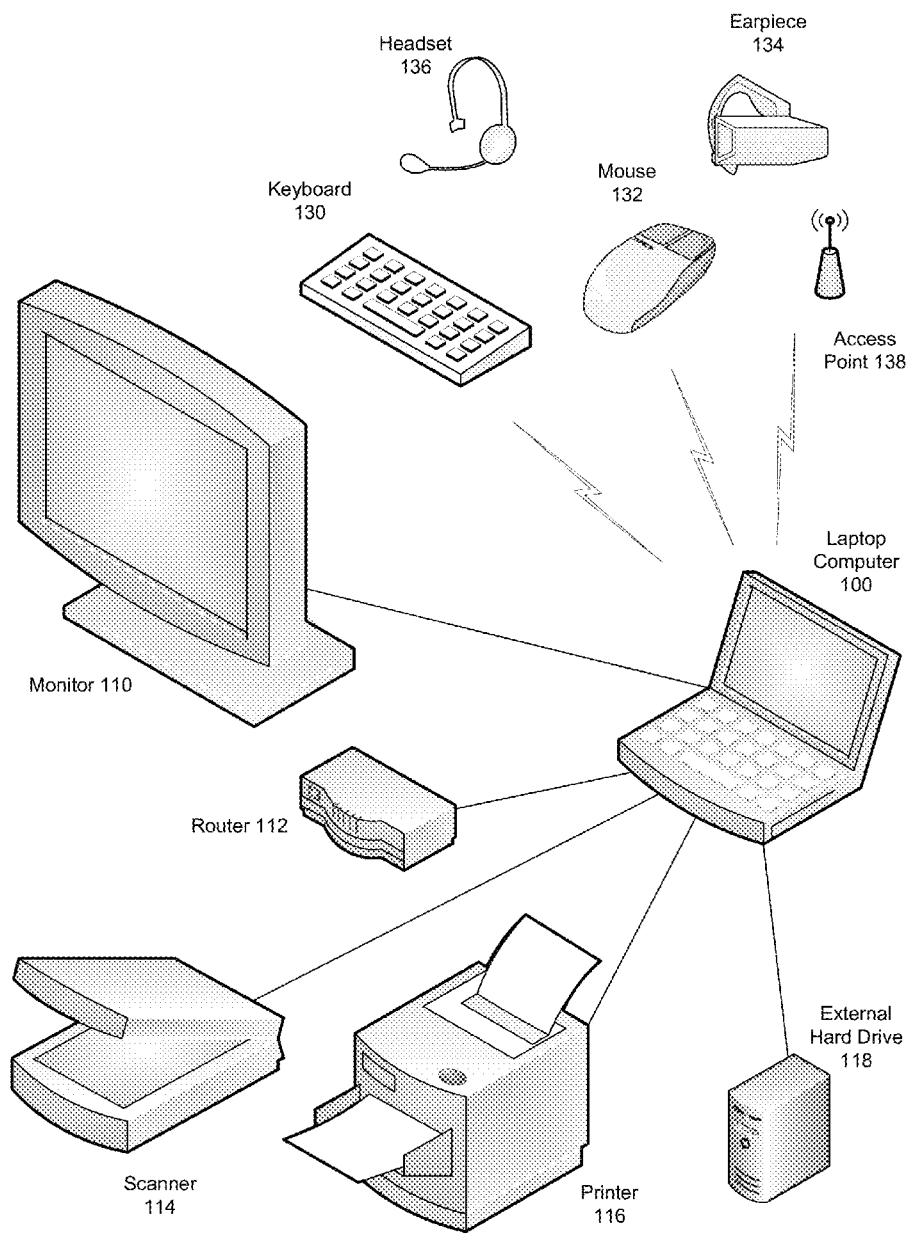
FIG. 1 is a diagram depicting a communication environment in which some embodiments of the invention may be implemented.

The following description is presented to enable any person skilled in the art to make and use the invention. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown.

In some embodiments of the invention, a system and method are provided for improving wireless communications of a host device. In particular, the communications are improved by increasing the RF (Radio Frequency) isolation of antennae or emitters used by two or more different wireless communication modules, thereby supporting their simultaneous use with reduced or no interference. Although embodiments are described as they may be implemented for Wi-Fi® and Bluetooth®, other embodiments of the invention are not limited to these specific technologies.

In embodiments of the invention described herein, when a peripheral component having its own Bluetooth module (e.g., chipset and antenna) is physically connected to the host computing device or system, the host detects the component's capability. The host device's Bluetooth module is deactivated, and the peripheral component's is activated. Subsequently, the host's Bluetooth communications (e.g., input from a mouse or keyboard, output to a headset or speaker) are conducted through the peripheral component.

Because the peripheral component is physically separated from the computing device, the computing device's Wi-Fi module and the peripheral component's Bluetooth modules consequently operate with greater antenna isolation and less interference.

In order to enable the peripheral component's Bluetooth module to communicate with other Bluetooth devices on the computing device's behalf, the computing device's link keys for those other Bluetooth devices are copied to the peripheral component before its Bluetooth module is activated. As one of ordinary skill in the art will recognize, when two Bluetooth devices are to operate together for the first time, one (e.g., the master) discovers the other (e.g., a slave) via a service discovery process. The devices will exchange some data (such as an initialization key or a public key, depending on the version of Bluetooth), and the devices create a link key that will be specific to the device's association, or "pairing," with the other device. Thereafter, each time they are in range of each other and their transceivers are active, they will automatically connect.

Thus, because the peripheral component will have the host device's link keys, it can act as a Bluetooth master, discover local devices and connect with them automatically. Although it is the computing device's Bluetooth communications that are seconded to a peripheral component in embodiments of the invention described below, in other embodiments some other communication capability is seconded.

FIG. 1 illustrates a computing environment in which some embodiments of the invention may be implemented.

In the illustrated environment, laptop 100 is a mobile computing device that can be physically coupled to various external peripheral components such as, but not limited to, monitor 110, router 112, scanner 114, printer 116 and external hard drive 118. In other environments, other components may be coupled (e.g., a switch, a modem, a camera, speakers, an Ethernet dongle).

Further, laptop computing device 100 hosts multiple wireless communication technologies, such as Wi-Fi® and Bluetooth® modules, either or both of which allow the computing device to communicate with keyboard 130, mouse 132, earpiece 134, headset 136, access point (AP) 138 and/or other components. In other environments, other wireless components may be coupled (e.g., other input/output devices, a camera, a sensor, a stereo system).

In order to promote more effective use of the wireless technologies so that, for example, they can be used simultaneously with less (or no) interference between them, a wireless communication module of one of the components physically coupled to computing device 100 will be used in place of the corresponding module of device 100. Thus, one or more of monitor 110, router 112, scanner 114, printer 116 and external hard drive 118 include Bluetooth modules or other communication modules corresponding to modules used by laptop computing device 100 to communicate with one or more of keyboard 130, mouse 132, earpiece 134, headset 136 and AP 138.

A peripheral component described as being coupled via a wired link in the illustrated environment may, in other embodiments of the invention, be coupled via a wireless link, and vice versa. Therefore, a Bluetooth communication module of one of components 110, 112, 114, 116 and 118 may handle Bluetooth operations for device 100 even if it is coupled to device 100 by a wireless link (other than Bluetooth) instead of a physical link.

Figure 2:
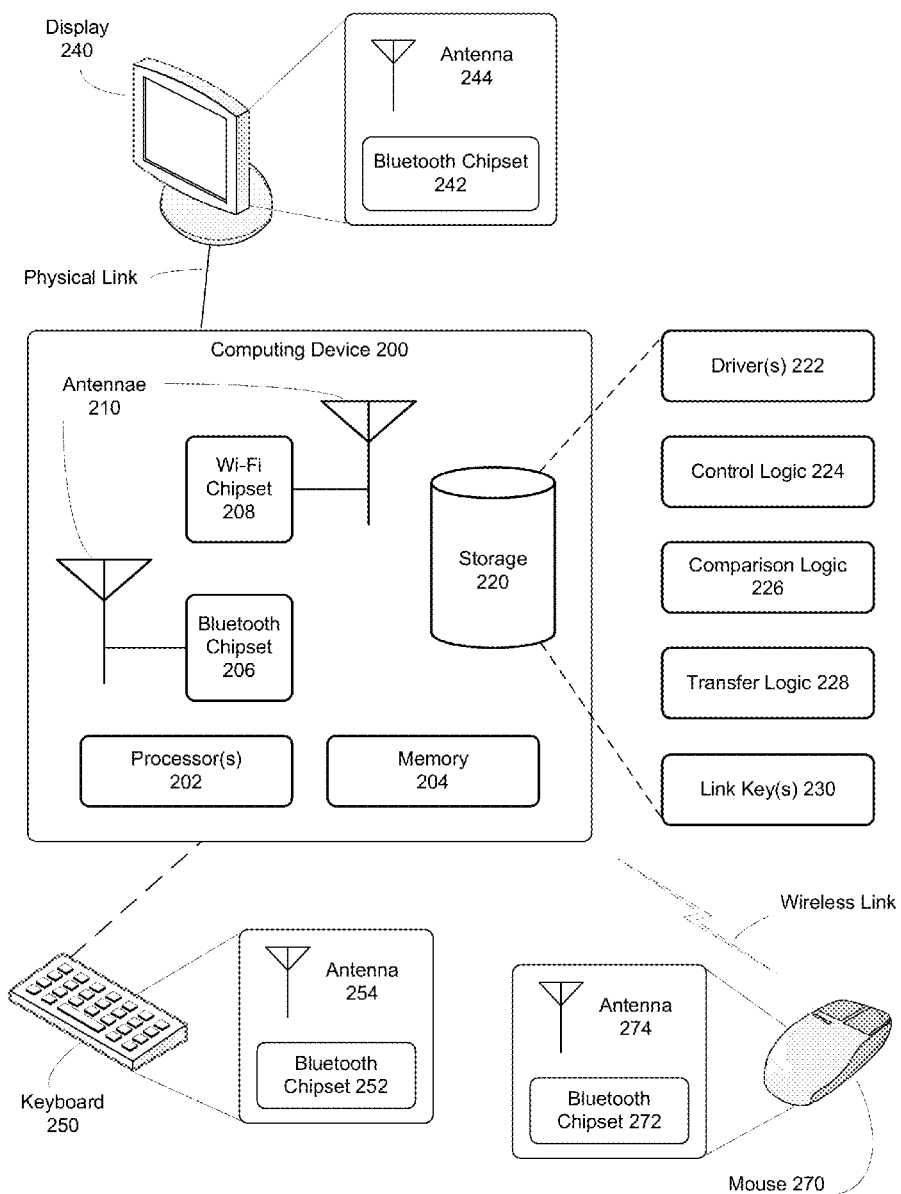
FIG. 2 is a block diagram of a system for conducting wireless communications, in accordance with some embodiments of the invention.

FIG. 2 is a block diagram of a system for improving wireless communications, according to some embodiments of the invention. As described above, in these embodiments, operation and control of Bluetooth communications are offloaded from computing device 200 to a component coupled to device 200. Computing device 200 may be a portable computing device, such as a laptop, notebook, netbook or tablet computer, may be a traditional desktop or workstation computer, or may be a smart phone, personal digital assistant or other device that offers computing capabilities and hosts wireless communication connections.

Computing device 200 is physically connected (e.g., via wired connectors) to display 240, and is wirelessly linked to pointing device (mouse) 270. Display 240 includes Bluetooth chipset 242 and antenna 244 for use by chipset 242. Similarly, mouse 270 includes Bluetooth chipset 272 and antenna 274 for use by chipset 272.

Keyboard 250 includes its own Bluetooth chipset and antenna (i.e., chipset 252 and antenna 254), and may be coupled to computing device 200 by a wired or a wireless link. Thus, in different implementations, keyboard 250 may takeover Bluetooth communications for device 200, or may have its Bluetooth communications with device 200 (i.e., key input) handled by another entity, such as display 240.

Computing device 200 includes one or more processors (e.g., processor 202), memory 204, Bluetooth chipset 206, Wi-Fi chipset 208, antennae 210 and storage 220. Each wireless technology thus has access to its own antenna and, in accordance with embodiments of the invention, will enjoy increased separation from the other technology's active antenna.

Storage 220 stores program code and data for operating computing device 200, such as drivers 222, control logic 224, comparison logic 226, transfer logic 228 and link key(s) 230. Additional logic or program instructions may be stored in storage 220, such as an operating system for device 200, application and/or utility programs, program data, etc.

Drivers 222 include instructions that are executed by processor 202 to operate components such as chipsets 206, 208. Control logic 224 includes instructions that may be executed by the processor to discover wireless communication capabilities of components coupled to computing device 200 (e.g., display 240, mouse 270) and/or to activate a communication chipset or module of such a component.

In some implementations, control logic 224 may be included in drivers 222. For example, drivers for one or more of chipsets 206, 208 may include logic for discovering other components/devices with which they can communicate and/or for transferring their tasks to corresponding chipsets of coupled components.

Comparison logic 226 includes instructions that may be executed by processor 202 to compare wireless communication capabilities. Illustratively, when a component (e.g., display 240) possesses a wireless communication capability that computing device 200 may be able to delegate communication responsibilities to (e.g., Bluetooth chipset 242), comparison logic 226 may be executed to determine if device 200 should do so. If multiple components having that communication capability are available (e.g., keyboard 250 and display 240), logic 226 may be executed to determine which of them should be tasked. In some implementations, comparison logic 226 may be included in a driver 222 for the corresponding communication chipset of device 200 (e.g., Bluetooth chipset 206).

Transfer logic 228 includes instructions that may be executed by processor 202 to transfer Bluetooth link keys and/or other data for configuring a component's wireless communication module to take over responsibility for the corresponding module of computing device 200. In some implementations, such other data may include a credential (e.g., username and password, digital certificate, encryption/decryption key), configuration data of device 200 (e.g., MAC address, network SSID) and so on. Transferred data may be necessary to allow the receiving component to communicate with other components, may allow the receiving component to mimic device 200, or may provide other benefits.

Link key(s) 230 include some or all link keys that computing device 200 has generated to pair it with Bluetooth-equipped peripheral components (and/or other devices), such as mouse 270. In some implementations, every time computing device 200 offloads Bluetooth operations to a component (e.g., display 240), it copies all of its link keys to that component. In other implementations, just a subset of the link keys may be copied, and/or may not be copied every time.

A Bluetooth chipset includes a radio and a baseband module, and may incorporate one or more semiconductors depending on implementation. A protocol stack for handling Bluetooth communications may be divided between a host stack implemented within an operating system or other program code executed by a processor, and a controller operating within the chipset. However, in some components, such as mouse 270 and/or others wirelessly coupled to computing device 200, a Bluetooth chipset may comprise both the host stack and the controller.

In some embodiments of the invention, when Bluetooth operations are transferred or offloaded from computing device 200 to an external peripheral component coupled to the computing device, the host stack may continue executing on device 200. A controller of chipset 206 is deactivated and a controller of the Bluetooth chipset of the peripheral component is activated. Device 200 and the peripheral may then exchange Bluetooth commands and operations via USB (Universal Serial Bus), UART (Universal Asynchronous Receiver-Transmitter), Thunderbolt or some other protocol or connection technology.

In these embodiments, the Bluetooth module in the peripheral component may simply appear as another USB-based (or UART-based or Thunderbolt-based, etc.) device to computing device 200. The same software stack that supported the computing device's native Bluetooth module can be used to enumerate and support the peripheral component's module.

Figure 3:
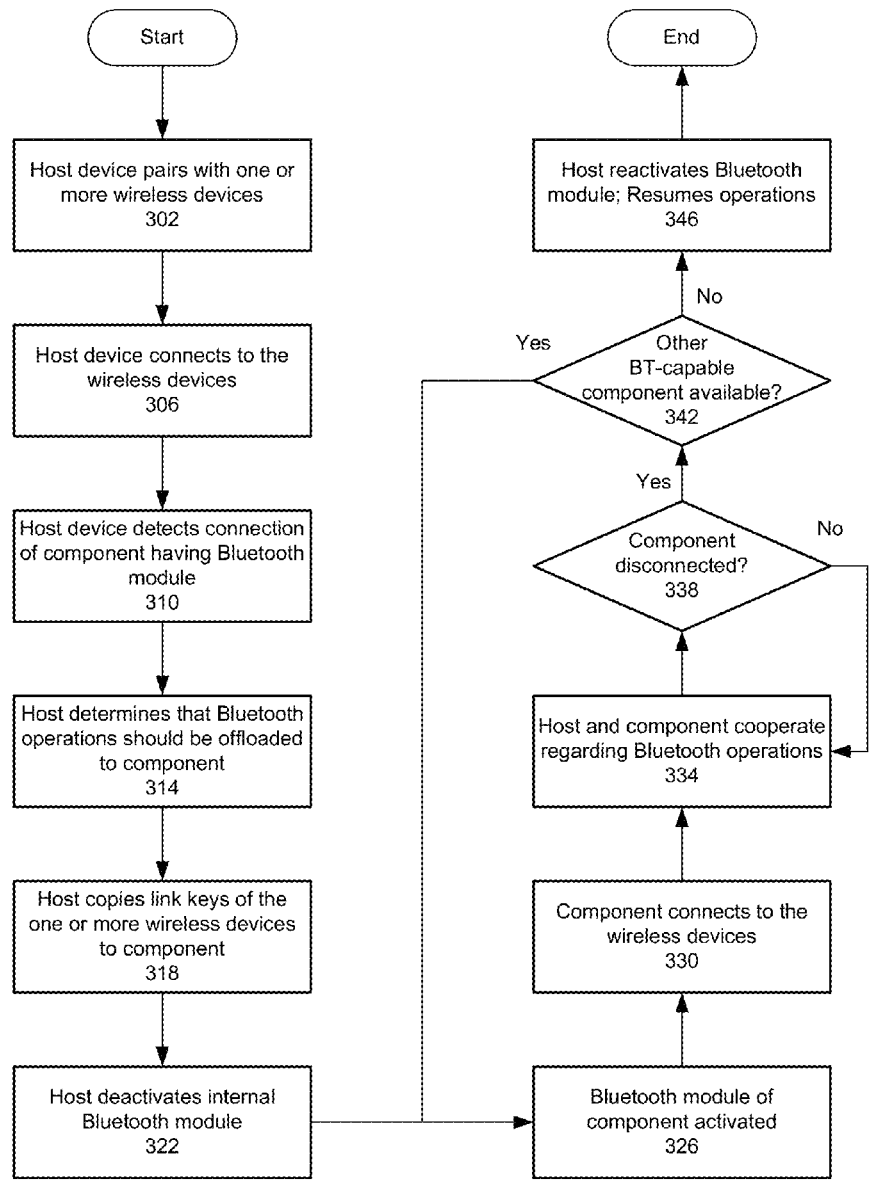
FIG. 3 is a flow diagram illustrating a method of conducting wireless communications, in accordance with some embodiments of the invention.

FIG. 3 is a flow diagram illustrating a method of improving wireless communication, according to some embodiments of the invention. In these embodiments, a host uses the wireless communications to exchange data (e.g., input/output) with entities such as a mouse, a keyboard, a headset, an access point, a network or other entity.

In operation 302, with a Bluetooth module of the host active, the host pairs with one or more wireless devices. For example, the host may be a portable computer and a user of the host may obtain a new wireless mouse and/or new wireless keyboard to use with the computer at home, at an office or some other location. During the pairing process, the host and a wireless device generate a shared link key, which lets them encrypt their exchanged data and/or authenticate each other.

In operation 306, because the host and wireless device(s) have paired, they will automatically connect if within range. If, for example, the components are left in one location (e.g., the user's home office) while the host is operated in a mobile fashion in other locations, when the user transports the host within range, the components can automatically re-connect.

In operation 310, the host detects connection of a peripheral component having its own Bluetooth capability. The connection may be wired or wireless; if wireless, in the illustrated embodiment of the invention the protocol for the wireless connection will not be Bluetooth, because Bluetooth operations are being offloaded to the peripheral component. This detection may be performed automatically by a driver for the host's Bluetooth module, as part of a discovery process, for example.

For example, when the peripheral component is connected to the host, its Bluetooth module may be enumerated as another available USB device. Therefore, all relevant information about the module (e.g., firmware version, vendor identity, product identity, device type) will be read by the host and the appropriate software stack (e.g., driver) will load.

In some implementations of the illustrated method of the invention, a determination is made as to whether the host has the latest software for operating USB devices and/or Bluetooth modules, or at least a suitable version, to ensure that if the peripheral component is newer than the host, that the host can correctly use the peripheral's Bluetooth module. A newer version may be installed as part of the illustrated method.

In operation 314, the host determines that it should offload Bluetooth operations to the peripheral component. In some implementations, the host must first confirm that the component's Bluetooth capabilities are robust enough to allow it to serve a master. This may entail identifying a Bluetooth version, a protocol stack and/or other characteristics of the component.

If multiple peripheral components having Bluetooth capabilities are connected to the host close in time, the host will select one of them to receive Bluetooth responsibility, either randomly or based on some intelligence. For example, based on the type of the component, some estimate may be made as to which component (or which component's Bluetooth antenna) is likely to be positioned furthest from the host and therefore provide better antenna isolation.

This decision may use a list that prioritizes peripherals regarding their suitability for assuming the host's Bluetooth operations. Thus, a display component might be preferred over an Ethernet dongle. Also, if it is learned that a peripheral component is frequently coupled to and uncoupled from the host, it may not be as suitable for assuming Bluetooth operations as another component that is more stable.

Similarly, if different peripheral components are connected to the host at different times, the host may or may not transfer Bluetooth operations from one component to another, depending on whether a newly connected component offers better isolation, increased capabilities (e.g., has a newer version of Bluetooth), etc.

In operation 318, the host copies some or all of its link keys to the peripheral component that will assume responsibility for Bluetooth operations on behalf of the host.

In operation 322, the host deactivates its internal Bluetooth module. Although this may terminate operation of its Bluetooth controller, the Bluetooth host stack—the portion of the protocol stack from the Host Controller Interface (HCI) level and up—will continue executing on the host in order to work with the peripheral component's Bluetooth module, determine if the component has been disconnected or become inoperative, continue discovering new components' Bluetooth capabilities, etc. Because the host is no longer using its Bluetooth chipset, it may consume less power.

In operation 326, the Bluetooth module of the peripheral component is activated. As described above, the host's Bluetooth software stack will be used to operate the component's Bluetooth module. Because the module's antenna enjoys greater separation from a potentially interfering transmitter (e.g., a Wi-Fi module of the host), it may be able to expend more power and therefore have greater range and/or provide better signal quality.

In operation 330, the component and wireless devices in range automatically connect. Because the component already has the necessary link keys, it does not need to be paired or bonded with the devices.

In operation 334, as input from a wireless input device (e.g., mouse, keyboard, microphone) is received at the component's Bluetooth module, it is processed by the module's controller and forwarded to the host similar to how the host's native Bluetooth module would convey it.

In operation 338, if the peripheral component is disconnected, turned off or becomes inoperative, the illustrated method advances to operation 342. Otherwise, the method may end or return to operation 334 to continue operations.

In operation 342, the host determines whether another peripheral component with Bluetooth capabilities is connected. If not, the method advances to operation 346; otherwise the host determines which component should take over Bluetooth operations (if there are multiple candidates), copies its link keys to that component and the method resumes at operation 326.

In operation 346, the host reactivates its Bluetooth module and resumes control of Bluetooth operations. After operation 346, the method ends.

The environment in which some embodiments of the invention are executed may incorporate a general-purpose computer or a special-purpose device such as a hand-held computer or communication device. Details of such devices (e.g., processor, memory, data storage, display) may be omitted for the sake of clarity.

Data structures and code described in this detailed description are typically stored on a non-transitory computer-readable storage medium, which may be any device or medium that can store code and/or data for use by a computer system. Non-transitory computer-readable storage media includes, but is not limited to, volatile memory, non-volatile memory, magnetic and optical storage devices such as disk drives, magnetic tape, CDs (compact discs), DVDs (digital versatile discs or digital video discs), or other non-transitory computer-readable media now known or later developed.

The methods and processes described in the detailed description can be embodied as code and/or data, which can be stored in a non-transitory computer-readable storage medium as described above. When a processor or computer system reads and executes the code and/or data stored on the medium, the processor or computer system performs the methods and processes embodied as data structures and code and stored within the medium.

Furthermore, the methods and processes described below can be included in hardware modules. For example, the hardware modules may include, but are not limited to, application-specific integrated circuit (ASIC) chips, field-programmable gate arrays (FPGAs) and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. An electronic device comprising:
   a first communication module;
   a first antenna used by the first communication module;
   configuration data for establishing a wireless communication connection with a first wireless device according to a first wireless communication protocol; and
   control logic executed by a processor of the electronic device when a first external component is coupled to the electronic device to:
      deactivate the first communication module of the electronic device;
      initiate activation of a first communication module of the first External component; and
      send the configuration data to the first external component;
   wherein the first communication module of the electronic device and the first communication module of the first external component conduct wireless communications according to the first wireless communication protocol.

2. The electronic device of claim 1, wherein the configuration data includes one or more Bluetooth® link keys.

3. The electronic device of claim 1, further comprising:
   a second communication module for conducting wireless communications according to a second wireless communication protocol different from the first wireless communication protocol.

4. The electronic device of claim 3, wherein the first wireless communication protocol is Bluetooth and the second wireless communication protocol is Wi-Fi®.

5. The electronic device of claim 3, further comprising:
   a second antenna used by the second communication module; and
   comparison logic executable by the processor of the electronic device to determine which of the following is further isolated from the second antenna:
      (a) an antenna used by the first communication module of the first external component; and
      (b) an antenna used by a first communication module of a second external component coupled to the electronic device, wherein the first communication module of the second external component conducts wireless communications according to the first wireless communication protocol.

6. The electronic device of claim 1, wherein the configuration data comprises information configured to enable the first external component to mimic the first communication module of the electronic device when conducting wireless communication according to the first wireless protocol.

7. The electronic device of claim 1, wherein the configuration data comprises information configured to enable the first external component to use a corresponding established communication session when conducting wireless communication according to the first wireless protocol.

8. The electronic device of claim 1,
   wherein the configuration data comprises information generated when establishing at least one wireless communication session between the first communication module of the electronic device and a first wireless device using the first wireless protocol; and
   wherein the configuration data is configured to enable the first external component to wirelessly communicate using the first wireless protocol with the first wireless device.

9. A method of conducting wireless communications at a host electronic device, the method comprising:
   coupling the host electronic device to a first external peripheral component;
   deactivating a first communication module of the host device;
   initiating activation of a first communication module of the first peripheral component;
   sending, from the host electronic device to the first peripheral component, configuration data for establishing a communication connection with a first wireless device according to a first wireless communication protocol; and
   operating the host electronic device to exchange communications with a first wireless device via the first communication module of the first peripheral component;
   wherein the first communication module of the host electronic device and the first communication module of the first peripheral component conduct wireless communications according to a first wireless communication protocol.

10. The method of claim 9, wherein the configuration data includes a set of link keys.

11. The method of claim 9, further comprising:
   operating a second communication module of the host electronic device for conducting communications according to a second wireless communication protocol different from the first wireless communication protocol.

12. The method of claim 11, further comprising:
   determining which of the first peripheral component and one or more additional peripheral components coupled to the host electronic device offers greater radio frequency isolation from the second communication module of the host electronic device.

13. The method of claim 9, further comprising:
   identifying wireless communication capabilities of the first peripheral component, the wireless communication capabilities including the first communication module of the first peripheral component.

14. A non-transitory computer-readable medium storing instructions that, when executed by a processor, cause the processor to perform a method of conducting wireless communications at a host electronic device, the method comprising:
   coupling the host electronic device to a first external peripheral component;
   deactivating a first communication module of the host device;

initiating activation of a first communication module of the first peripheral component;

sending, from the host electronic device to the first peripheral component, configuration data for establishing a communication connection with a first wireless device according to a first wireless communication protocol: and operating the host electronic device to exchange communications with a first wireless device via the first communication module of the first peripheral component;

wherein the first communication module of the host electronic device and the first communication module of the first peripheral component conduct wireless communications according to a first wireless communication protocol.

15. A system for conducting wireless communications, the system comprising:
- a host device including:
- a processor;
- a first communication module; and
- a second communication module;
- a first electronic component coupled to the host device and including a first communication module;
- a first set of wireless devices, wherein each device in the first set of wireless devices includes a first communication module; and
- logic executable by the processor of the host device to:
- send to the first electronic component data for establishing wireless communication connections with the first set of wireless devices;
- deactivate the first communication module of the host device; and
- initiate activation of the first communication module of the first electronic component;

wherein the first communication module of the host device, the first communication module of the first electronic component and the first communication module of each device in the first set of wireless devices conduct wireless communications according to a first wireless communication technology; and wherein the second communication module of the host device conducts wireless communications according to a second wireless communication technology.

16. The system of claim 15, further comprising:
a second set of wireless devices, wherein each device in the second set of wireless devices includes a second communication module for conducting wireless communications according to the second wireless communication technology.

17. The system of claim 15, further comprising:
logic executable by the processor of the host device to determine which of the following is further from an antenna used by the second communication module of the host device:
(a) an antenna used by the first communication module of the first electronic component; and
(b) an antenna used by a first communication module of a second electronic component coupled to the host device.

18. The system of claim 15, wherein the data for establishing wireless communication connections includes individual link keys for each device in the first set of wireless devices.

19. The system of claim 18, wherein the first communication module of the first electronic component automatically establishes a wireless communication link with each device in the first set of wireless devices after the first communication module of the first electronic component is activated.

* * * * *